(12) United States Patent
Smelyanskiy et al.

(10) Patent No.: US 12,731,065 B2
(45) Date of Patent: Sep. 8, 2026

(54) BAYESIAN QUANTUM CIRCUIT FIDELITY ESTIMATION

(71) Applicant: Google LLC, Mountain View, CA (US)

(72) Inventors: Vadim Smelyanskiy, Mountain View, CA (US); Alexander Korotkov, Riverside, CA (US); Sergio Boixo Castrillo, Rancho Palos Verdes, CA (US)

(73) Assignee: Google LLC, Mountain View, CA (US)

( * ) Notice: Subject to any disclaimer, the term of this patent is extended or adjusted under 35 U.S.C. 154(b) by 1289 days.

(21) Appl. No.: 17/623,385

(22) PCT Filed: Oct. 25, 2019

(86) PCT No.: PCT/US2019/058039
§ 371 (c)(1),
(2) Date: Dec. 28, 2021

(87) PCT Pub. No.: WO2020/263302
PCT Pub. Date: Dec. 30, 2020

(65) Prior Publication Data

US 2022/0374750 A1 Nov. 24, 2022

Related U.S. Application Data

(60) Provisional application No. 62/868,245, filed on Jun. 28, 2019.

(51) Int. Cl.
*G06N 10/70* (2022.01)
*G06N 10/20* (2022.01)
*G06N 10/40* (2022.01)

(52) U.S. Cl.
CPC ............ *G06N 10/70* (2022.01); *G06N 10/20* (2022.01); *G06N 10/40* (2022.01)

(58) Field of Classification Search
CPC ......... G06N 10/70; G06N 10/40; G06N 10/20
See application file for complete search history.

(56) References Cited

U.S. PATENT DOCUMENTS

2014/0358793 A1 12/2014 Pastawski et al.
2019/0156239 A1 5/2019 Martinis et al.

FOREIGN PATENT DOCUMENTS

KR 10-2019-0027215 3/2019

OTHER PUBLICATIONS

Characterizing quantum supremacy in near term devices; Boixo et al. ("Boixo") pp. 1-23, Apr. 6, 2017.*

(Continued)

*Primary Examiner* — Sherrod L Keaton
(74) *Attorney, Agent, or Firm* — Fish & Richardson P.C.

(57) ABSTRACT

Methods, systems and apparatus for estimating the fidelity of a quantum computing system. In one aspect, a method includes defining one or more random quantum circuits, wherein a noisy experimental implementation of each random quantum circuit is approximated by a depolarizing channel with respective polarization parameter; generating, for each defined random quantum circuit and by the quantum computing system, a set of experimental data, wherein data items in the set of experimental data comprise measured bit strings corresponding to experimental implementations of the random quantum circuit; determining, for each of the one or more random quantum circuits, an estimate of the respective polarization parameter, comprising maximizing a log-likelihood of the polarization parameter conditioned on the respective set of experimental data using series inversion; and determining an estimate of the fidelity of the quantum computing system based on the determined estimates of respective polarization parameters.

14 Claims, 2 Drawing Sheets

(56) References Cited

OTHER PUBLICATIONS

A comparative study of estimation methods in quantum tomography; Acharya et al. ("Acharya") pp. 1-40, Jan. 23, 2019.*
Boixo et al., "Characterizing Quantum Supremacy in Near-Term Devices," arXiv, Apr. 5, 2017, 23 pages.
Boixo et al., "Characterizing quantum supremacy in near-term devices," Nature Physics, Apr. 23, 2018, 14:595-600.
Fogarty et al., "Nonexponential fidelity decay in randomized benchmarking with low-frequency noise," Physical Review A, Aug. 11, 2015, 92(2):1-7.
International Preliminary Report on Patentability in International Appln. No. PCT/US2019/058039, mailed on Jan. 6, 2022, 13 pages.
International Search Report and Written Opinion in International Appln. No. PCT/US2019/058039, mailed on Mar. 13, 2020, 20 pages.
Magesan et al., "Characterizing quantum gates via randomized benchmarking," Phys. Rev. A 85, Apr. 11, 2012, 16 pages.
Magesan et al., "Scalable and Robust Randomized Benchmarking of Quantum Processes," Phys. Rev. Lett. 106, May 6, 2011, 4 pages.
Office Action in Australian Appln. No. 2019454998, dated Nov. 17, 2022, 3 pages.
Office Action in Canadian Appln. No. 3144243, dated Jan. 11, 2023, 7 pages.
Sacchi, "Maximum-likelihood reconstruction of completely positive maps," Physical Review A, Apr. 13, 2001, 63(5):1-4.
Notice of Allowance in Australian Appln. No. 2023203229, mailed on Jul. 12, 2024, 3 pages.
Office Action in Chinese Appln. No. 201980097975.1, mailed on Dec. 31, 2024, 10 pages (with English translation).
Notice of Allowance in Australian Appln. No. 2024227513, mailed on Dec. 16, 2025, 3 pages.

* cited by examiner

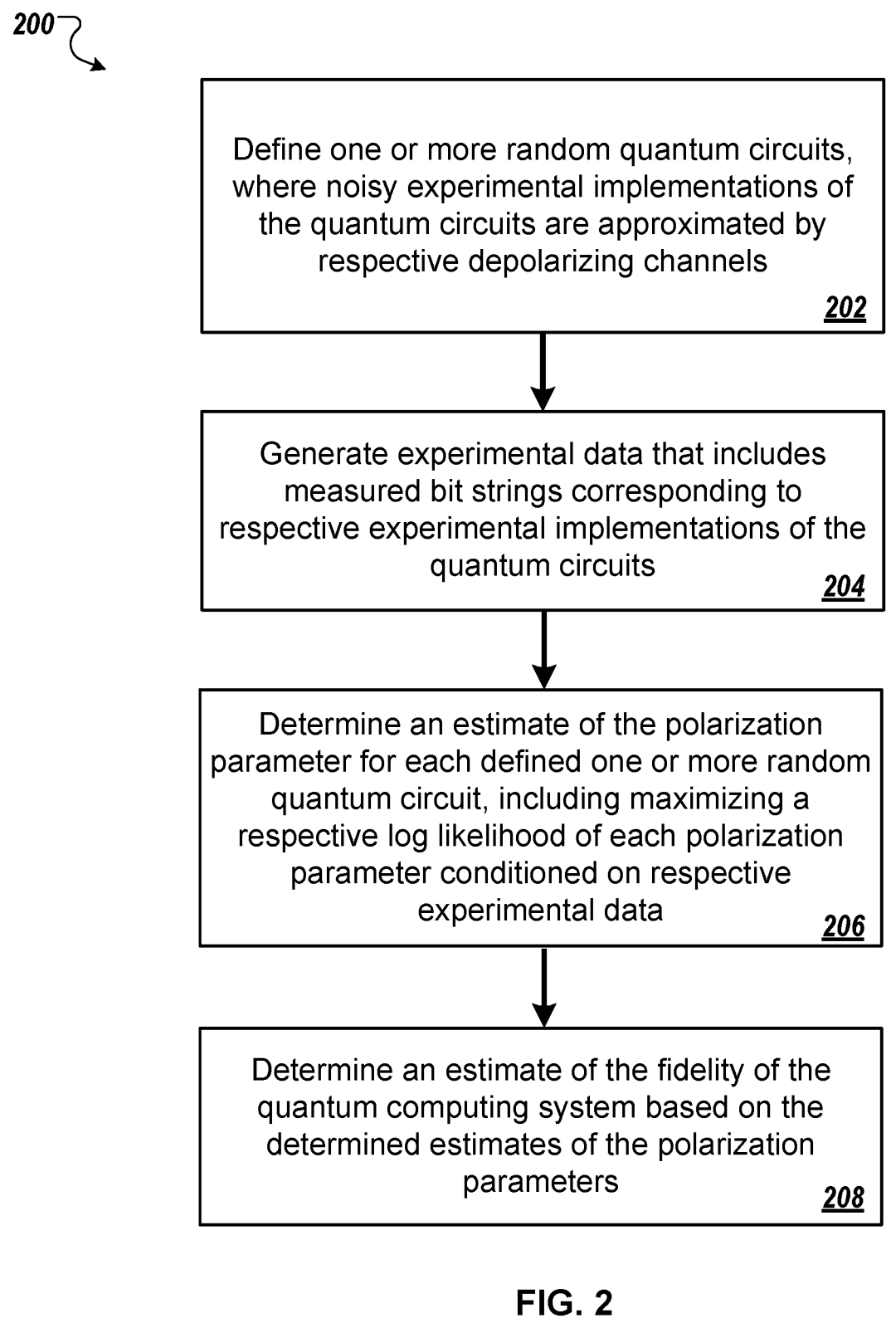

200

Define one or more random quantum circuits, where noisy experimental implementations of the quantum circuits are approximated by respective depolarizing channels 202

Generate experimental data that includes measured bit strings corresponding to respective experimental implementations of the quantum circuits 204

Determine an estimate of the polarization parameter for each defined one or more random quantum circuit, including maximizing a respective log likelihood of each polarization parameter conditioned on respective experimental data 206

Determine an estimate of the fidelity of the quantum computing system based on the determined estimates of the polarization parameters 208

FIG. 2

BAYESIAN QUANTUM CIRCUIT FIDELITY ESTIMATION

CROSS-REFERENCE TO RELATED APPLICATION

This application is a National Stage Application under 35 U.S.C. § 371 and claims the benefit of International Application No. PCT/US2019/058039, filed on Oct. 25, 2019, which claims priority to U.S. Provisional Application Ser. No. 62/868,245, filed on Jun. 28, 2019. The disclosures of the prior applications are considered part of and are incorporated by reference in the disclosure of this application.

BACKGROUND

This specification relates to quantum computing.

Quantum computing uses quantum-mechanical phenomena such as superposition and entanglement to perform computations. A quantum circuit is one example model for quantum computation in which a computation is a sequence of quantum logic gates, which are reversible transformations on a quantum mechanical analog of an n-bit register.

SUMMARY

This specification describes techniques for estimating the fidelity of quantum circuits.

In general, one innovative aspect of the subject matter described in this specification can be implemented in a method for method for estimating the fidelity of a quantum computing system, the method comprising: defining one or more random quantum circuits, wherein a noisy experimental implementation of each random quantum circuit is approximated by a depolarizing channel with respective polarization parameter; generating, for each defined random quantum circuit and by the quantum computing system, a set of experimental data, wherein data items in the set of experimental data comprise measured bit strings corresponding to experimental implementations of the random quantum circuit; determining, for each of the one or more random quantum circuits, an estimate of the respective polarization parameter, comprising maximizing a log-likelihood of the polarization parameter conditioned on the respective set of experimental data using series inversion; and determining an estimate of the fidelity of the quantum computing system based on the determined estimates of respective polarization parameters.

Other implementations of this aspect include corresponding classical and quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations determining an estimate of the respective polarization parameter comprises: defining a new variable as equal to $$NP_U(Z_k)-1,$$

where N represents Hilbert space dimension and $P_U(Z_k)$ represents a probability that an ideal implementation of the random quantum circuit U produces an eigenstate corresponding to the k-th data item in the respective set of experimental data; and substituting the new variable into a first equation for the first derivative of the log-likelihood of the polarization parameter conditioned on the respective set of experimental data to obtain an infinite series representation of the first equation.

In some implementations maximizing the log-likelihood of the polarization parameter conditioned on the respective set of experimental data using series inversion comprises: computing a solution to the infinite series representation of the first equation for the first derivative of the log-likelihood of the polarization parameter conditioned on the respective set of experimental data using series inversion.

In some implementations generating a set of experimental data for a defined random quantum circuit comprises, repeatedly, for a predetermined number of times: initializing a quantum computing system qubit register in an initial state; applying the defined random quantum circuit to the initial state to generate an evolved state; and measuring the evolved state to obtain a bit string.

In some implementations the method further comprises determining a variance of the estimate of the respective polarization parameter by computing a second derivative of the log-likelihood of the polarization parameter conditioned on the respective set of experimental data.

In some implementations outputs of experimental implementations of the one or more random quantum circuits are approximated by a Porter-Thomas distribution.

In some implementations the one or more quantum circuits comprise random quantum circuits that operate on a same number of qubits and have a same circuit depth.

In some implementations determining an estimate of the fidelity of the quantum computing system based on the determined estimates of respective polarization parameters comprises: computing an average estimate of the polarization parameter; and determining an estimate of the fidelity of the quantum computing system using the average estimate of the polarization parameter.

In some implementations the estimate of the fidelity F of the quantum computing system is given by $$F=p+(1-p)/D,\text{ where }D=2^n$$

represents Hilbert space dimension and n represents a number of qubits on which the defined one or more random quantum circuits operate.

In some implementations the method further comprises calculating an estimate of Pauli error rate of the quantum computing system using the average estimate of the polarization parameter.

In some implementations the estimate of Pauli error rate $r_{pauli}$ of the quantum computing system is given by $$r_{Pauli} = (1 - p)\left(1 - \frac{1}{D^2}\right)$$

where $D=2^n$ represents Hilbert space dimension and n represents a number of qubits on which the defined one or more random quantum circuits operate.

In some implementations the method further comprises determining one or more properties of the quantum computing system using the determined estimate of the fidelity of quantum computing system.

In some implementations the method further comprises determining one or more adjustments to quantum hardware control parameters based on the determined estimate of the fidelity; and implementing the determined one or more adjustments to perform quantum computations using quantum computing hardware.

The subject matter described in this specification can be implemented in particular ways so as to realize one or more of the following advantages.

A system implementing the presently described techniques can estimate fidelities of quantum circuits implemented by quantum computing hardware with increased accuracy. In particular, since the estimations are maximum-likelihood estimations, fidelities estimated using the presently described techniques have a smaller variance compared to estimates generated using other techniques, e.g., cross entropy benchmarking.

In addition, the estimates generated using the presently described techniques are based on direct and easy-to-use analytical expressions for the mean and variance of the circuit fidelity in terms of observed data. These analytical expressions make obtaining the maximum-likelihood estimate of the fidelity and its variance computationally efficient and comparable in complexity to other techniques, e.g., cross entropy benchmarking techniques that are based on average values of quantum observables. In addition, unlike other techniques such as cross entropy benchmarking, the presently described techniques are scalable to moderate-sizes quantum circuits, e.g., to 40 qubits and beyond, and do not restrict to a particular set of quantum gates, e.g., to Clifford gates.

The presently described techniques can be applied to improve quantum computing hardware and the precision of quantum control—a critical feature of high fidelity quantum computing (e.g., because high fidelity quantum gates require high precision control). For example, quantum circuit fidelities can be used to calibrate or validate quantum computing hardware, or to determine adjustments that may improve the accuracy or efficiency of existing quantum computing hardware. Since circuit fidelities estimated using the techniques described in this specification are accurate, adjustments, calibrations or validations determined using the estimated circuit fidelities may be more effective.

Details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for estimating the fidelity of quantum computing hardware.

DETAILED DESCRIPTION

Overview

Figure 1:
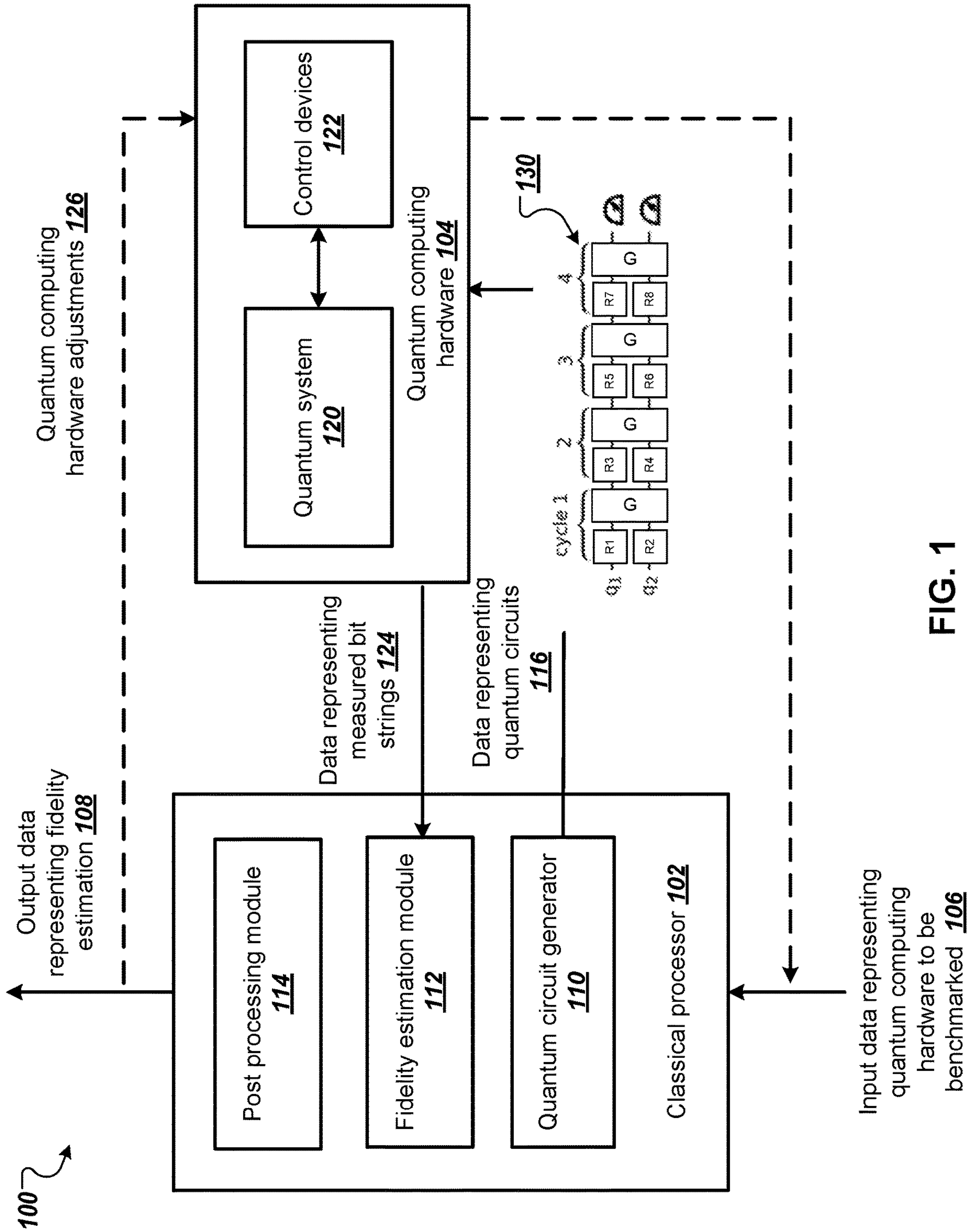
FIG. 1 depicts an example system for benchmarking quantum computing hardware.

A quantum circuit is a model for quantum computation in which quantum logic gates are applied in a specific sequence to a register of qubits to encode quantum information. In theory, any quantum algorithm can be implemented with high precision by applying a correctly chosen sequence of quantum logic gates. However, in practice quantum logic gates are error prone—instead of implementing a unitary quantum operation representing an ideal quantum logic gate, a corresponding noisy quantum operation is implemented.

Benchmarking of quantum circuits is a necessary step towards building reliable quantum computers. Benchmarking can also be used in the process of a quantum computer operation for periodic calibration. The task is to characterize how far the quantum states produced by a quantum machine are from the states expected for the ideal quantum operation, thus characterizing amount of errors. The benchmarking is usually performed using random quantum circuits and outputs a single number called fidelity of quantum operations.

Quantum logic gate fidelity is a measure of how close a noisy quantum operation $\varepsilon$ is to an ideal unitary quantum operation $\mathcal{U}$. The quantum logic gate fidelity between $\varepsilon$ and $\mathcal{U}$ for a given quantum state p may be given by $$\mathcal{F}_{\mathcal{E},\mathcal{U}}(\rho) = \left(tr\left(\sqrt{\sqrt{\mathcal{U}(\rho)}\,\mathcal{E}(\rho)\sqrt{\mathcal{U}(\rho)}}\right)\right)^2.$$

Estimating quantum logic gate fidelity is an important procedure for adjusting or correcting quantum hardware that physically realizes quantum logic gates and, in turn, is an important procedure for performing successful quantum computations.

This specification describes a Bayesian approach to estimating the fidelity of quantum operations, e.g., quantum circuit fidelity. The presently described methods and system use a likelihood probability function in conjunction with the quantum depolarizing channel model to obtain a maximum-likelihood estimate of the quantum circuit fidelity. The same likelihood function can also be used to determine a Bayes-rule-based probability distribution for the quantum circuit fidelity.

Example Hardware

FIG. 1 depicts an example system 100 for benchmarking quantum computing hardware. The example system 100 is an example of a system implemented as classical and quantum computer programs on one or more classical computers and quantum computers in one or more locations, in which the systems, components, and techniques described below can be implemented.

The system 100 includes a classical processor 102 in data communication with quantum computing hardware 104. For convenience, the classical processor 102 and quantum computing hardware 104 are illustrated as separate entities. However in some implementations the classical processor 102 can be included in quantum computing hardware 104, e.g., the quantum computing hardware 104 can include one or more components for performing classical computing operations.

The quantum computing hardware 104 includes components for performing quantum computations using quantum circuits. For example, the quantum computing hardware 104 includes a quantum system 120 and control devices 122. The quantum system 120 includes one or more multi-level quantum subsystems, e.g., qubits, that are used to perform algorithmic operations or quantum computations. The specific realization of the multi-level quantum subsystems that the quantum computing hardware 104 includes and how they interact with one another is dependent on a variety of factors including the type of quantum computations that the quantum computing hardware is performing. For example, the multi-level quantum subsystems may include qubits that are realized via atomic, molecular or solid-state quantum systems. In other examples the qubits may include, but are not limited to, superconducting qubits or semi-conducting qubits.

The multi-level quantum subsystems can be frequency tunable. For example, each qubit may have associated operating frequencies that can be adjusted, e.g., using one or more control devices 122, through application of voltage pulses via one or more drivelines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform two-qubit or many-qubit gates.

The control devices 122 can further include measurement devices, e.g., readout resonators. Measurement results obtained via measurement devices may be provided to classical processors included in the quantum computing hardware 104 or to the classical processor 102 for processing and analyzing.

The classical processor 102 receives as input data 106 representing quantum computing hardware to be benchmarked. The classical processor 102 processes the received input data 106 to generate as output data 108 representing benchmarking results. For example, the output data 108 may include data representing an estimated fidelity of the quantum computing hardware.

The classical processor 102 includes multiple components for processing received input data. For example, the classical processor 102 can include a quantum circuit generator 110, fidelity estimation module 112 and post processing module 114.

The quantum circuit generator 110 can be configured to define multiple random quantum circuits. The multiple random quantum circuits defined by the quantum circuit generator 110 are quantum circuits that can be implemented by the quantum computing hardware 104, i.e., the quantum computing hardware being benchmarked.

A random quantum circuit is a quantum circuit that includes one or more quantum gates that are randomly sampled from a predetermined set of quantum gates. For example, the quantum circuit generator 110 can define multiple random quantum circuits that each include one or more respective randomly sampled single qubit gates and a same multi-qubit quantum gate or many multi-qubit gates acting on different qubits. For example, the random quantum circuit generator 110 can be configured to randomly sample single qubit gates from a predefined set of single qubit gates. One non-limiting example set can include $$X^{\frac{1}{2}}, Y^{\frac{1}{2}},$$

and T quantum gates, where $$X^{\frac{1}{2}}$$

represents a π/2 rotation aroung the X axis, $$Y^{\frac{1}{2}}$$

represents a π/2 rotation aroung the y axis, and T represents a non-Clifford diagonal matrix $\{0, e^{i\pi/4}\}$. Other non-limiting example sets include Clifford+T gates or a Haar random set. In some implementations single qubit gates included in random quantum circuits defined by the random quantum circuit generator 110 can have approximately equal error rates, e.g., the error rate of each single qubit gate in a set of single qubit gates from which the random quantum circuit generator 110 samples from are from a predetermine range of error rates.

The random quantum circuits defined by the quantum circuit generator 110 can have different depths. The quantum circuit generator 110 can define circuits of different depths by applying multiple clock cycles of gates. That is, the quantum circuit generator 110 can define a random quantum circuit of depth d as being equal to d cycles of a same sequence of gates. In some implementations the quantum circuit generator 110 can define a sequence of gates, e.g., including multiple randomly sampled single qubit gates followed by a multi-qubit gate, and define multiple random quantum circuits using the defined sequence of gates, where each defined random quantum circuit corresponds to a respective number of cycles of the defined sequence of gates.

Quantum circuit 130 is an example of a random quantum circuit generated by the quantum circuit generator 110. Example quantum circuit 130 shows a quantum circuit that is configured to operate on two qubits $q_1$, $q_2$. The example quantum circuit 130 includes four cycles, where each cycle includes two randomly sampled single qubit gates, e.g., cycle 1 includes randomly sampled single qubit gates $R_1$, $R_2$ that operate on qubits $q_1$, $q_2$, respectively, cycle 2 includes randomly sampled single qubit gates $R_3$, $R_4$ that operate on qubits $q_1$, $q_2$, respectively, etc. Each cycle also includes a respective instance G of a two-qubit gate.

The quantum circuit generator 110 can define multiple groups of circuits, where each group of circuits operates on a same number of qubits and includes circuits with a same depth. Because circuits in a same group have a same number of gates of each type (randomly sampled single qubit gates and multi-qubit gates), the fidelity of each circuit in the group is similar, as described in more detail below with reference to FIG. 2. Each defined quantum circuit has the property that a noisy experimental implementation of the quantum circuit is approximated by a respective depolarizing channel, as described in more detail below with reference to step 202 of FIG. 2.

The classical processor 102 can be configured to transmit data 116 representing defined quantum circuits to the quantum computing hardware 104. The quantum computing hardware 104 is configured to apply defined quantum circuits to the quantum system 120 using the control devices 122, as described above, and provide as output data representing results of the circuit implementations, e.g., data 124 representing measured bit strings.

The fidelity estimation module 112 can be configured to estimate a fidelity of the quantum circuits generated by the quantum circuit generator 110 and implemented by the quantum computing hardware 104. For example, the fidelity estimation module 112 can be configured to perform the operations described below with reference to FIG. 2. In some implementations the fidelity estimation module 112 can also be configured to perform additional operations to obtain additional information about the quantum computing hardware, e.g., a fidelity variance, as described in more detail below with reference to FIG. 2.

The post processing module 114 can be configured to process or analyze estimated fidelities to determine properties of the quantum computing hardware 104, e.g., its performance, or to calibrate or validate the quantum computing hardware 104. In some implementations the post processing module 114 may further generate as output data representing one or more adjustments 126 that may be used to adjust and improve the quantum computing hardware 104. For example, the post processing module 114 may use the estimated fidelities to determine adjustments to how the quantum computing hardware is controlled when implementing a particular quantum circuit or type of quantum circuits, e.g., determine modifications to the programming of the control devices 122 to achieve higher fidelity quantum gates. An outer loop may then be performed to find optimal experimental controls to improve the performance of the quantum computing hardware 104.

The classical processor 102 provides as output data 108 representing the determined quantum state purity. The classical processor 102 can also provide as output data 126 representing determined adjustments to the quantum computing hardware 104. Data 126 representing determined adjustments can be provided to and implemented by the quantum computing hardware 104 when performing future computations to improve the operation and/or performance of the quantum computing hardware 104.

Programming the Hardware

FIG. 2 is a flow diagram of an example process 200 for estimating the fidelity of a quantum computing system. For convenience, the process 200 will be described as being performed by a system of one or more classical and/or quantum computing systems located in one or more locations. For example, the system 100 of FIG. 1, appropriately programmed in accordance with this specification, can perform the process 200.

The system defines one or more random quantum circuits to use to estimate the fidelity of the quantum computing system (step 202). The defined random quantum circuits are quantum circuits that can be implemented by the quantum computing system that is being benchmarked. The one or more random quantum circuits defined by the system include circuits that operate on a same number of qubits and that have a same circuit depth. Each defined random quantum circuit U has the property that a noisy experimental implementation of the quantum circuit is approximated by a respective depolarizing channel, as given below in Equation (1).

$$\varepsilon_U(\rho) = \rho U \rho U^{\dagger} + (1-p)\frac{\mathbb{I}}{N} \tag{1}$$

In Equation (1), N represents Hilbert space dimension, p is a parameter representing polarization (which is related to the fidelity of the quantum circuit U, as described in more detail below), and ρ represents the state of the qubits after the quantum circuit U has been applied.

The system generates a set of experimental data $\{Z_j\}$ (step 204). The generated set of experimental data includes data items $Z_1, \ldots, Z_M$ that represent measured bit strings corresponding to respective experimental implementations of the one or more random quantum circuits. To generate the set of experimental data, the system repeatedly, for a predetermined number of times: initializes a qubit register in an initial state; applies a respective defined quantum circuit to the initial state to generate an evolved state; and measures the evolved state to obtain a corresponding bit string.

The system determines an estimate of the fidelity of the quantum computing system based on maximizing log-likelihoods of the polarization of each of the one or more random quantum circuits conditioned on the generated set of experimental data (step 206). The system defines the likelihood of the polarization of one of the one or more random quantum circuits conditioned on respective experimental data as given in Equation (2) below.

$$\mathcal{L}(p|\text{data}) = \prod_{k=1}^{M} P_{\varepsilon}(Z_k) = \prod_{k=1}^{M} \langle Z_k|\varepsilon_U(|\psi_0\rangle\langle\psi_0|)|Z_k\rangle \tag{2}$$

In Equation (2), $P_\varepsilon(Z_k)$ represents a probability that a noisy implementations of the random quantum circuit U produces bit string $Z_k$ in the generated set of experimental data, $|\psi_0\rangle$ represents an initial state of the quantum system, and $|Z_k\rangle$ represents an eigenstate corresponding to the bit string $Z_k$ (the eigenvalue). From Equation (1), the probability $P_\varepsilon(Z_k)$ can also be given by Equation (3) below.

$$P_\varepsilon(Z_k) = pP_U(Z_k) + \frac{1-p}{N} \tag{3}$$

In Equation (3), $P_U(Z_k)=|\langle Z_k|U|\psi_0\rangle^2$.

The log likelihood of the polarization of the random quantum circuit conditioned on the respective experimental data is given by Equation (4) below.

$$\ell(p|\text{data}) = \log \mathcal{L}(p|\text{data}) \tag{4}$$

The estimate p* of the polarization p that corresponds to the maximum of the log likelihood given in Equation (4) above is given by Equation (5) below.

$$p^* = \arg\max_p \mathcal{L}(p|\text{data}) \tag{5}$$

Therefore, to determine an estimate p* of the polarization p, the system solves for p* from Equation (6) below.

$$\frac{d\ell(p^*|\text{data})}{dp} = \sum_{k=1}^{M} \frac{P_U(Z_k) - 1/N}{p^* P_U(Z_k) + (1-p^*)/N} = 0 \tag{6}$$

The system solves for p* by performing variable substitution and maximizing the log-likelihood of the polarization of the random quantum circuit conditioned on the respective experimental data using series inversion. More specifically, the system defines a new variable $w_k$ as defined below in Equation (7).

$$w_k = NP_U(Z_k) - 1 \tag{7}$$

In Equation (7) N represents Hilbert space dimension and $P_U(Z_k)$ represents a probability that an ideal implementations of the random quantum circuit U produces an eigenstate corresponding to the k-th data item in the generated set of experimental data.

The system substitutes the new variable $w_k$ given by Equation (7) into Equation (6) to give Equation (8) below.

$$\sum_{k=1}^{M} \frac{w_k}{1 + p^* w_k} = 0 \tag{8}$$

where $$\sum_{k=1}^{M} \frac{w_k}{1 + p^* w_k} = \sum_{l=1}^{\infty} (-p^*)^l \sum_{k=1}^{M} w_k^{l+1} = 0 \tag{9}$$

The system solves Equations (8) and (9) using series inversion to obtain an estimate p* of the polarization p, as given below in Equation (10).

$$p^* = \frac{\sum_{k=1}^{M} w_k}{\sum_{k=1}^{M} w_k^2} + \left(\frac{\sum_{k=1}^{M} w_k}{\sum_{k=1}^{M} w_k^2}\right)^2 \frac{\sum_{k=1}^{M} w_k^3}{\sum_{k=1}^{M} w_k^2} + \dots \tag{10}$$

For example, since the higher order terms are negligible, the system can determine an estimate p* of the polarization p by computing the first two terms in Equation (10).

The system can determine an estimate p* of the polarization p corresponding to each of the defined one or more random quantum circuits, i.e., perform the calculations described above with reference to Equations (2)-(10) for each of the defined random quantum circuits. The system can then determine an average of the polarization p* based on the estimates of polarization for each of the defined random circuits. The average estimation of the polarization can be used to determine an estimate of the fidelity of the quantum computing system.

As an alternative to performing the calculations described above with reference to Equations (2)-(10) for each of the defined random quantum circuits, the system can perform the calculations once, where U represents the different defined random quantum circuits and not just one of the defined random quantum circuits. This can produce an accurate estimate p* of the polarization p because of the condition that the one or more random quantum circuits defined by the system include circuits that operate on a same number of qubits and that have a same circuit depth.

The system determines an estimate of the fidelity F of the quantum computing system by calculating $$F = p + (1-p)/D,$$

where $D=2^n$ represents the Hilbert space dimension and n represents the number of qubits on which the defined random quantum circuits operate. The system can also determine the Pauli error rate of the quantum computing system by calculating $$r_{Pauli} = (1-p)\left(1 - \frac{1}{D^2}\right).$$

In some implementations the system may further determine respective variances of the estimates of the polarizations by computing second derivatives of the log-likelihoods of the polarizations corresponding to the respective quantum circuit conditioned on the corresponding experimental data, e.g., by evaluating Equation (11) below for each random quantum circuit.

$$-\frac{d^2\ell(p^*|\text{data})}{d^2p} = \frac{1}{\langle (p-p^*)^2 \rangle} \tag{11}$$

The system can then determine an average variance of polarization. In implementations where outputs of experimental implementations of the one or more random quantum circuits can be approximated by a Porter-Thomas distribution, and if N>>1, the system approximates Equation (12) using Equation (12) below.

$$\langle (p-p^*)^2 \rangle \simeq \frac{(1+p^*)^2}{M} \tag{12}$$

In some implementations the system may further determine one or more properties of the quantum computing system using the estimate of the fidelity and/or the variance of the estimate of the fidelity, and the Pauli error rate. For example, the estimated fidelity or Pauli error rate may be used to determine the performance of the quantum computing system. As another example, the estimated fidelity may be used to (i) calibrate, (ii) validate, or (iii) benchmark quantum computing hardware implementing the quantum circuit.

In some implementations the system can determine one or more adjustments to quantum computing hardware using the estimate of the fidelity and/or the variance of the estimate of the fidelity. For example, the system can determine adjustments to control parameters of a control model used by the quantum computing hardware to implement quantum operations to improve the fidelity of the quantum operations. The system can use the adjusted control model to implement the quantum operations with increased fidelity in future quantum computations. The control model may be a model that relates parameters of the quantum gates (e.g. phases, qubit rotation angles etc.) to physical parameters of the system/systems used to implement/control the quantum gate (e.g. voltages, pulse shapes, frequencies etc.)

For example, parameters of a control model may be updated based on optimizing a cost function (also referred to as an objective function or loss function) that is dependent on the fidelity with respect to the parameters of the control model. The cost function may comprise one or more terms dependent on the fidelity. In some embodiments, the cost function is the fidelity itself. An optimization procedure, such as gradient descent, may be used to substantially optimize the cost function. The optimization procedure may be an iterative procedure.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for estimating the fidelity of a quantum computing system, the method comprising:

defining one or more random quantum circuits, wherein a noisy experimental implementation of each random quantum circuit is approximated by a depolarizing channel with respective polarization parameter;

generating, for each defined random quantum circuit and by the quantum computing system, a set of experimental data, wherein data items in the set of experimental data comprise measured bit strings corresponding to experimental implementations of the random quantum circuit;

determining, for each of the one or more random quantum circuits, an estimate of the respective polarization parameter, comprising:

computing, for each measured bit string in the respective set of experimental data, an output probability as a weighted combination of (i) a probability that an ideal implementation of the random quantum circuit produces a measurement eigenstate corresponding to the measured bit string and (ii) a uniform probability over all possible bit strings, wherein weights of the weighted combination are determined based on the polarization parameter;

forming a log-likelihood of the polarization parameter based on the computed output probabilities; and maximizing the log-likelihood of the polarization parameter using series inversion; and determining, using the determined estimates of respective polarization parameters, an estimate of the fidelity of the quantum computing system.

2. The method of claim 1, wherein determining an estimate of the respective polarization parameter comprises:

defining a new variable as equal to $DP_U(Z_k)-1$, where D represents Hilbert space dimension and $P_U(Z_k)$ represents a probability $P_U$ that an ideal implementation of the random quantum circuit U produces a measurement eigenstate corresponding to the k-th measured bit string $Z_k$ in the respective set of experimental data; and substituting the new variable into a first equation for the first derivative of the log-likelihood of the polarization parameter conditioned on the respective set of experimental data to obtain an infinite series representation of the first equation.

3. The method of claim 2, wherein maximizing the log-likelihood of the polarization parameter conditioned on the respective set of experimental data using series inversion comprises:

computing a solution to the infinite series representation of the first equation for the first derivative of the log-likelihood of the polarization parameter conditioned on the respective set of experimental data using series inversion.

4. The method of claim 1, wherein generating a set of experimental data for a defined random quantum circuit comprises, repeatedly, for a predetermined number of times:

initializing a quantum computing system qubit register in an initial state;

applying the defined random quantum circuit to the initial state to generate an evolved state; and measuring the evolved state to obtain a bit string.

5. The method of claim 1, further comprising determining a variance of the estimate of the respective polarization parameter by computing a second derivative of the log-likelihood of the polarization parameter conditioned on the respective set of experimental data.

6. The method of claim 1, wherein outputs of experimental implementations of the one or more random quantum circuits are approximated by a Porter-Thomas distribution.

7. The method of claim 1, wherein the one or more quantum circuits comprise random quantum circuits that operate on a same number of qubits and have a same circuit depth.

8. The method of claim 1, wherein determining, using the determined estimates of respective polarization parameters, an estimate of the fidelity of the quantum computing system comprises:

computing an average estimate of the polarization parameter; and determining an estimate of the fidelity of the quantum computing system using the average estimate of the polarization parameter.

9. The method of claim 8, wherein the estimate of the fidelity F of the quantum computing system is given by $$F = p + (1 - p)/D,$$

where p represents the average estimate of the polarization parameter, $D=2^n$ represents Hilbert space dimension, and n represents a number of qubits on which the defined one or more random quantum circuits operate.

10. The method of claim 8, further comprising calculating an estimate of Pauli error rate of the quantum computing system using the average estimate of the polarization parameter.

11. The method of claim 10, wherein the estimate of Pauli error rate r Pauli of the quantum computing system is given by $$r_{Pauli} = (1 - p)\left(1 - \frac{1}{D^2}\right)$$

where p represents the average estimate of the polarization parameter, $D=2^n$ represents Hilbert space dimension, and n represents a number of qubits on which the defined one or more random quantum circuits operate.

12. The method of claim 1, further comprising determining one or more properties of the quantum computing system using the determined estimate of the fidelity of quantum computing system.

13. The method of claim 1, further comprising:

determining one or more adjustments to quantum hardware control parameters based on the determined estimate of the fidelity; and implementing the determined one or more adjustments to perform quantum computations using quantum computing hardware.

14. An apparatus comprising:

one or more classical processors; and quantum computing hardware in data communication with the one or more classical processors;

wherein the apparatus is configured to perform operations comprising:

defining one or more random quantum circuits, wherein a noisy experimental implementation of each random quantum circuit is approximated by a depolarizing channel with respective polarization parameter;

generating, for each defined random quantum circuit and by the quantum computing system, a set of experimental data, wherein data items in the set of experimental data comprise measured bit strings corresponding to experimental implementations of the random quantum circuit;

determining, for each of the one or more random quantum circuits, an estimate of the respective polarization parameter, comprising:

computing, for each measured bit string in the respective set of experimental data, an output probability as a weighted combination of (i) a probability that an ideal implementation of the random quantum circuit produces a measurement eigenstate corresponding to the measured bit string and (ii) a uniform probability over all possible bit strings, wherein weights of the weighted combination are determined based on the polarization parameter;

forming a log-likelihood of the polarization parameter based on the computed output probabilities; and maximizing the log-likelihood of the polarization parameter using series inversion; and determining, using the determined estimates of respective polarization parameters, an estimate of the fidelity of the quantum computing system.

* * * * *